United States Patent [19]

Peterson

[11] Patent Number: 4,547,897

[45] Date of Patent: Oct. 15, 1985

[54] IMAGE PROCESSING FOR PART INSPECTION

[75] Inventor: Russell H. Peterson, Bloomington, Minn.

[73] Assignee: Honeywell Inc., Minneapolis, Minn.

[21] Appl. No.: 462,744

[22] Filed: Feb. 1, 1983

[51] Int. Cl.$^4$ .......................... H04N 9/04; G06K 9/46
[52] U.S. Cl. ...................................... 382/8; 356/402; 358/22; 358/101; 382/17
[58] Field of Search ...................... 358/22, 27, 43, 44, 358/71, 101; 382/17, 8; 250/226; 356/425, 402, 405, 406, 408

[56] References Cited

U.S. PATENT DOCUMENTS 3,560,638   2/1971   Skrydstrup et al. ................... 358/22
4,007,327   2/1977   Cousin ................................... 358/22

*Primary Examiner*—Leo H. Boudreau
*Attorney, Agent, or Firm*—Charles J. Ungemach

[57] ABSTRACT

Apparatus for use with black and white processing systems to detect and identify color as observed by a color television camera including a chromakeyer which is set to select a particular color and submit this as part of the information to the image processing system.

7 Claims, 1 Drawing Figure

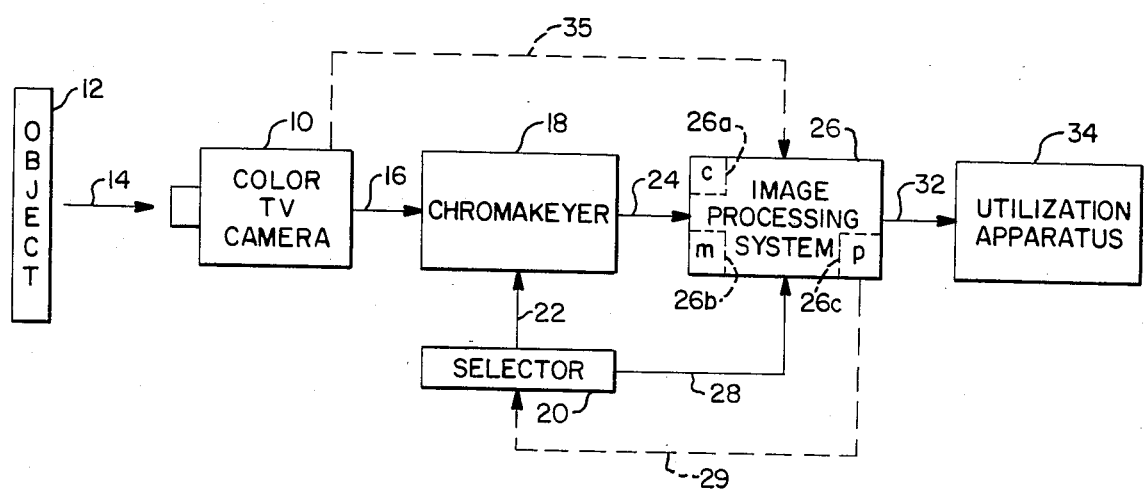

IMAGE PROCESSING FOR PART INSPECTION

BACKGROUND OF THE INVENTION

The present invention relates to industrial inspection of manufactured items and more particularly to the detection of, for example, the presence or absence of parts, the identification of parts, and their position or orientation, all automatically.

Prior art inspection apparatus has, for the most part, involved the use of a black and white television camera which observes the manufactured item and operates to produce a video output signal representative of the item. The signal is presented to an image processor which assigns a binary or gray scale digital value to each pixel of the picture in accordance with the amount of black and white at that point in the overall image. The digital representation of the image may then be compared with a standard image or picture (template matching) or, in more advanced systems, the individual pixels will be used by a computer in the image processor to compute the area, perimeter, coordinates, orientation, etc. of the parts. The parts are known by the contrast they have with the background and thus digital information is obtained as to the various features of the item which are needed to identify it or its parts. The information which is gathered concerning the area, perimeter, orientation, etc. may then be stored in a memory of the computer in the image processor and then compared or matched with predetermined or known values programmed into the computer so as to attempt a match area, perimeter, orientation, etc. If a match occurs within the proper tolerance, an identification is made of the part, its location, etc. The output of the image processor may be a display for use by a human operator or may be command to a machine or a robot device for selecting, placing or passing the part.

A difficulty arises when parts differ from their background only in color and cannot be recognized in black and white, or when parts of the same shape and area differ only in color since they may appear the same when analyzed in black and white. As an example, the color coding on a resistor identifies its value and yet the resistor is of the same size and shape as the resistor of a different value for all practical purposes and gray scale analysis of color coded bands is not a reliable code indicator. Likewise a capacitor may have exactly the same size and shape as a resistor but is of a different color and the identification of that capacitor depends upon the identification of the color involved. Also the capacitor may be of very similar gray level as the underlying circuit board and cannot be distinguished even though the board is green and the capacitor is red.

Prior art systems have tried to handle this problem by utilizing a color television camera and then processing the Red, Green, and Blue (RGB) signals with three separate image processing devices to assign digital values for each of the color components and then marrying the results and comparing them to determine the color as well as the other features of the part being observed. Unfortunately, such systems are quite costly in that they involve three separate image processing paths and they take considerably more time than is desired.

SUMMARY OF THE INVENTION

The present invention operates to produce dramatic speed and cost advantages over the above-described prior art color systems by conversion of the hue content of the color television picture into a standard black and white (gray scale) T.V. signal that can be processed by the single channel apparatus described above. More particularly, the technique for separation of the hue information from the picture is obtained from a standard device known in the television industry as a chromakeyer. The chromakeyer produces an analog T.V. signal which is brightest where the hue is in a selected range and darkest where the hue is the color negative of the selected range. For example, the chromakeyer can be set to produce a bright image where blue is encountered and will thus produce a dark image where yellow is encountered since blue and yellow are color negatives. The chromakeyer is used in the television broadcasting industry for the merging of pictures, as, for example, insertion of a news story picture into the screen behind a news anchor man. This may be accomplished by making the screen blue and feeding the output of the video camera to a chromakeyer feeding a switcher. The switcher takes the portion of the televised studio picture which is not blue from the anchor man's studio and substitutes for the blue portion of the studio scene a scene from a different source (camera, tape, etc.).

The present invention uses a chromakeyer to provide an alternative picture for use by a standard image processing system. More particularly, the use of a chromakeyer allows the normal luminescence image to be replaced by a "hue" image as the input to the gray scale industrial image processing system. The result is that the contrast is based on color rather than brightness and any color of the spectrum can be highlighted. For example, if a yellow capacitor were being sought, the chromakeyer could be set to select yellow in which event all signals from the scene containing yellow would be highlighted and the yellow capacitor would be quite bright. This would be then fed into the image processing equipment which would assign digital values to the capacitor's image that were quite white on the gray scale. A blue device would be assigned digital values that were quite dark on the gray scale and thus even though the part were of the same size, shape, and orientation, the difference in color between blue and yellow would be easily determined. More significantly, the yellow objects (e.g. the capacitor) would become the brightest areas in the gray level "hue" image and would be, therefore, readily distinguished from green background, white or silver colored objects, or other orange parts. Even gold, which has more red tint, is distinguishable from yellow.

The approach of the present invention improves the speed of operation by several orders of magnitude and the cost of implementing the approach is only about one tenth of the cost of the prior art color imaging processing system. Ordinary black and white image processing may still be made using the invention and, in fact, cleaner images are generated because the hue image contains little highlighting due to reflections. The present invention which creates a gray scale representation of a "hue" image can be used as an alternative to conventional black and white image processing or can be used in addition to and in conjunction with analysis of the conventional gray scale representation of the black and white "luminescence" image.

BRIEF DESCRIPTION OF THE DRAWINGS

The sole FIGURE shows a block diagram of the present invention.

DETAILED DESCRIPTION OF THE PREFERRED EMBODIMENT

In the FIGURE, a color T.V. camera 10 which may be of any standard variety, is shown receiving light from a remote object 12 along a path generally shown by an arrow 14. The remote object 12 may be a manufactured item such as a circuit board or may be a collection of parts or components whose identity, position, orientation, etc. are to be determined. The output of the color television camera 10 is a standard video signal(s) which is presented by a connection 16 to a chromakeyer 18. A selector device 20, which is normally a potentiometer, and which may be part of the chromakeyer 18, is shown connected to the chromakeyer 18 by a connection 22. The chromakeyer device 18 is a device developed for the television broadcast industry and has as a purpose the separation of hue information from a scene being viewed. More particularly, the selector 20 may be positioned either manually or automatically, as will be hereinafter described, to a desired color and the chromakeyer 18 will highlight that color coming from the color T.V. camera 10. The color negative of the selected color will be suppressed so that on an output 24 from the chromakeyer, an RS 170 composite video signal will exist which shows the selected color very brightly and the negative of the selected color very dark with the colors in between existing in intensity in accordance with their distance from the selected color on a T.V. color wheel. The output 24 is connected to an image processing system 26 which may be a standard black and white system that is compatible with an RS 170, composite video signal such as the Autovision II processor manufactured by Automatix Inc. The processor 26 includes a computer "c" identified by dashed line 26a, a memory "m" shown by dashed line 26b and a program "p" shown by dashed line 26c. In operation, the processor 26 assigns digital values to each individual pixel in the image information it receives from the chromakeyer 18. Accordingly, the image processing system will assign nearly white digital values on the gray scale to those parts of the video signal which are of the selected color and will assign nearly black values to those parts of the image which are of a color which is the negative of the selected color. For example, blue is the negative of yellow, and accordingly, if the selector 20 is set to select yellow as the color to be viewed, all yellow components in the object 12 would receive high or nearly white gray scale values by the image processing system 26 whereas all blue components in the object 12 would receive a very low or nearly black gray scale values by the image processing system 26. Other colors such as red, green, etc. would have gray scale values based upon their color separation on a standard T.V. color wheel from the selected color, yellow. Non-color areas of the scene, such as white, black, gray, or silver, will be given medium gray scale values and are therefore distinguishable from either yellow or blue but ambiguous with red, green, or other colors. The gray scale values are stored in the memory 26b.

The image processing system controls or receives information as to the color selected by the selector 20 through a connection 28 so that the digital gray scale values of high white content will be known to be yellow and the digital gray scale values of very low white content will be known to be blue in the example given. The image processing system operates as it did in the prior black and white system, i.e., by comparing the gray scale values in memory 26b with predetermined values according to the program 26c, and thus the computer 26a is able to determine the area, periphery, orientation, etc. of the part which would now be known to be yellow and thus better identify it than was done in the prior art. If desired, the selector 20 may then be set to observe another color and the same process would be repeated and likewise for every color in the object which is to be detected.

The selector 20 may be operated manually if only one or a few colors are sought, but in normal practice, selector 20 would, through an I/O control signal connection shown as dashed line 29 under program 26c instruction in the image processor 26, be automatically positioned in accordance with a predetermined sequence to various color positions obtained from the previously known number of objects of the various colors in the object 12. The imaging processing system would operate rapidly on the black and white information as in the prior art system and would know, by virtue of the selector's position received over a connection 28 which color was being looked at at any time. Thus at the output of the imaging processing system shown as arrow 32, signals indicative of the desired positions, area, orientations, etc. of the components on object 12 are produced all automatically and in accordance with the colors thereof. This signal may be used by any desired utilization apparatus 34 for inspection, processing or viewing as for example a black and white T.V. viewer.

If the object 12 contains non-colored objects, e.g. black parts, white marks, solder/silver circuit paths, etc., then the image from the color T.V. camera 10 can be connected directly to the image processing system 26 by a connection shown as dashed line 35 which may be either a standard RS170 composite video interface similar to the chromakeyer output 24, or may be RGB (separate Red, Green, Blue) signals. In either case the image processor 26 interprets the raw color information for its conventional gray scale "luminescence" part information, either independently or in conjunction with its interpretation of the chromakeyer "hue" part information and, therefore, can recognize and distinguish black from gray from white and these from the various colors (red, orange, blue, green, cyan, magenta, etc.).

In addition to identification of areas in the T.V. scene which are a particular color the present invention can be used to determine unambiguously what color is in each area of the scene. This is accomplished by first taking one image with the selector 20 in any predetermined position on the color spectrum on the standard T.V. color wheel and then taking a second image with the selector 20 rotated 90° on the T.V. color wheel. If yellow is selected for the first image, for example, then yellow parts and blue parts (negative of yellow) are unambiguously identified as white and black areas of the chromakeyer 18 output image; however, areas of gray in this image are ambiguous between colors in the clockwise direction from yellow on the T.V. color wheel and colors which are equal distance in the counter-clockwise direction on the T.V. color wheel, e.g. in this example Green is equal distance with Red on the T.V. color wheel relative to Yellow (and Blue) and are therefore the same shade of gray in the chromakeyer 18 output signal 24.

The second image taken with the selector 20 moved 90° from yellow, for example, midway between Green and Cyan, will allow resolution of the red/green ambiguity since this second image will result in whiter pixels on the green side of the color wheel and blacker pixels on the red side. Thus the image processor 26 can use the combined data in the first and second images to identify which color (hue) is present in each pixel of the scene without the need for prior knowledge of what specific color to expect. This will also allow the image processor 26 to examine the object 12 for parts of a variety of colors with only two pictures taken and thus avoid the time consuming process of taking one picture for each expected color in the scene.

Accordingly, it is seen that I have provided a new and improved image processing system for industrial processing. Many changes will occur to those skilled in the art, and I do not intend to be limited by the specific descriptions used in connection with the preferred embodiment shown herein. I intend only to be limited by the following claims.

I claim:

1. The method of inspecting a manufactured item to determine a selected characteristic thereof comprising the steps of:
    viewing an item with a color television camera to produce a video signal;
    selecting a predetermined color with a chromakeyer connected to the camera to receive the video signal and to produce a modified signal wherein the selected color is highlighted;
    assigning gray scale values based on hue to individual portions of the modified signal so that the highlighted portions receive higher gray scale values; and
    comparing the higher gray scale values with predetermined values to determine the selected characteristic when a match occurs.

2. The method of claim 1 wherein the step of assigning gray scale values based on hue is assigning digital gray scale values and includes the additional step of storing the digital gray scale values in a memory of a computer, the predetermined values also being stored in the memory of the computer.

3. The method of claim 1 wherein the step of selecting a predetermined color includes the step of automatically selecting more than one predetermined color at a later time in accordance with a predetermined program.

4. Industrial inspection apparatus for inspecting a manufactured item and determining a desired characteristic thereof comprising:
    a color television camera viewing the item and producing an electronic output representative of an image of the object;
    a chromakeyer connected to said camera to receive the electronic output and operable to produce a modified output in which a selected color is highlighted; and
    gray scale image processing apparatus connected to said chromakeyer to receive the modified output, said image processing apparatus assigning gray scale values to individual portions of the modified output with the selected color being assigned gray scale values which are higher than non-selected colors so that such higher values may be used for determining the desired characteristic of the item.

5. Apparatus according to claim 4 where the gray scale values are digital and said image processing apparatus includes a computer for storing the digital gray scale values in a memory, the computer being programmed to compare the digital gray scale values with predetermined values, a match indicating the desired characteristic.

6. Apparatus according to claim 4 wherein said chromakeyer includes a selector operable to change the selected color.

7. Apparatus according to claim 6 wherein said selector is operated in accordance with a predetermined program.

* * * * *